United States Patent [19]

Dreyer

[11] 4,020,991

[45] May 3, 1977

[54] MACHINE FOR THE PNEUMATIC SPREADING OF GRANULAR MATERIAL

[75] Inventor: Heinz Dreyer, Hasbergen-Gaste, Germany

[73] Assignee: Amazonen-Werke H. Dreyer, Hasbergen-Gaste, Germany

[22] Filed: Mar. 10, 1976

[21] Appl. No.: 665,669

[52] U.S. Cl. .............................. 239/655; 239/167; 239/176; 239/661
[51] Int. Cl.² .................. A01C 15/04; B05B 1/20
[58] Field of Search ..................... 239/159–169, 239/172, 175, 176, 654, 655, 661, 664; 222/176, 178

[56] References Cited

UNITED STATES PATENTS

| 2,712,198 | 7/1955 | Smith | 239/164 X |
| 2,765,195 | 10/1956 | Hodges | 239/167 |

FOREIGN PATENTS OR APPLICATIONS

| 1,001,044 | 1/1957 | Germany | 239/159 |
| 597,210 | 8/1959 | Italy | 239/175 |
| 587,484 | 4/1947 | United Kingdom | 239/166 |

Primary Examiner—Robert S. Ward, Jr.
Attorney, Agent, or Firm—Burgess, Dinklage & Sprung

[57] ABSTRACT

A machine for broadcasting material over the ground having booms (15) which carry flexible distributing conduits (10), and extend laterally outwardly from the centrally disposed hopper (2) for broadcasting of the material, and are folded up, about horizontal pivot axes (19), against the hopper for transport of the machine over e.g., roads. Each boom includes an inner boom member (17) and an outer boom member (18) which are pivotally connected at an axis (22) so that the outer boom member can be folded into alignment with the inner boom member in the direction of travel (16). By this construction the width required for the booms when in the transport condition is reduced.

23 Claims, 8 Drawing Figures

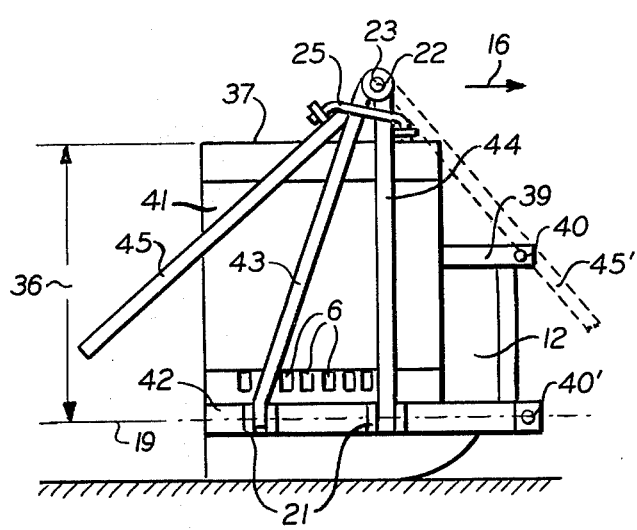
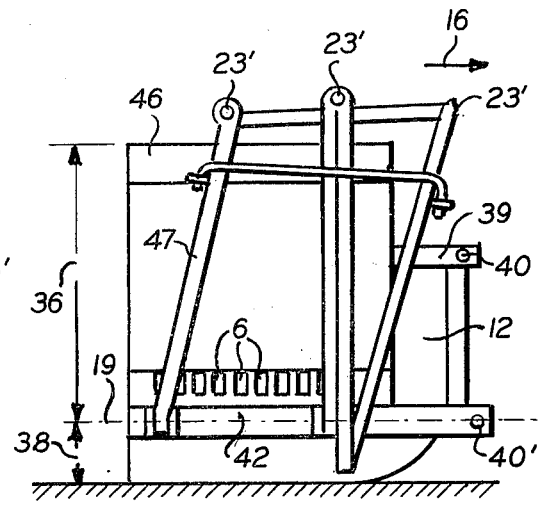
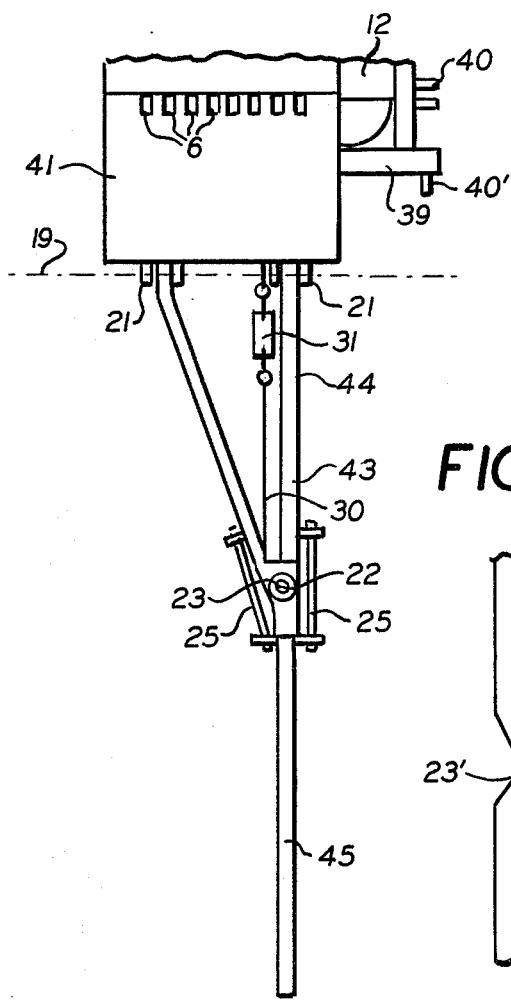
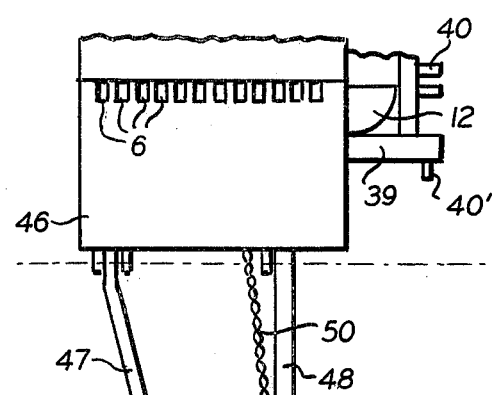
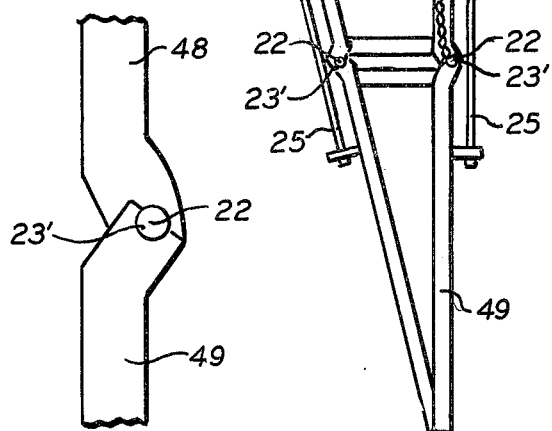

MACHINE FOR THE PNEUMATIC SPREADING OF GRANULAR MATERIAL

BACKGROUND

The invention relates to a machine for the pneumatic broadcasting of granular material, which has a central reservoir or hopper from which the material is delivered through a metering mechanism to a plurality of tubular conduits which are connected to a blower and discharge the material rearwardly through openings located on the body of the machine and at intervals along booms extending outwardly from either side of said body transversely of the direction of travel, the said booms being articulated to the body of the machine so as to be able to be raised against the body for travel over the road (transport position) or lowered for broadcasting the material (working position), the raising and lowering movement being limited by abutment means.

German "Auslegeschrift" No. 1,197,262 has disclosed a folding harrow frame in which the lateral arms are each divided into an inside section and an outside section, and all sections are articulated on horizontal axes parallel to the direction of travel, such that the bottoms of the outside sections are folded against the bottoms of the inside sections when the frame is in the transport position, thereby adding to the folded width of the frame. In this frame, too, there exists the disadvantage that damage can be done to the frame sections when they are in the working position if they encounter an obstruction or if the outside frame sections strike against the ground due to the rocking of the tractor pulling the harrow over uneven terrain.

THE INVENTION

The invention is addressed to the problem of achieving, in a machine of the type described in the beginning, a very low overall height and narrow overall width for its transportation and storage, together with a very great working width and high output per unit of area, while at the same time avoiding the disadvantages described above.

This problem is solved in accordance with the invention by dividing each side boom in a known manner into an inside boom section and an outside boom section, but articulating the outside boom section on the inside boom section on an upright axis, such that the folding of the former against the latter boom sections will take place in a plane parallel to the direction of travel of the machine, and by providing a means for locking the outside boom sections in their extended, working position.

As a result of these measures it is possible for the side booms to be retracted tightly against the reservoir or hopper in the transport position, while the outside boom sections will no longer add to the folded width of the boom. Consequently, the width of the hopper can be optimized in conformity with public rules and regulations governing transportation on roads and highways, the low overall height of the machine being achieved by the division and folding of the booms. Also, without diminishing the capacity of the hopper with respect to the state of the art, the hopper can be made relatively low in height, resulting in greater ease of loading, and also in greater ease in the unloading of the hopper into other conveyances, since the side booms do not have to be removed for the purpose.

Furthermore, as a result of these measures, the mechanical effort is greatly reduced because, when folding the booms from the working position to the transport position, for example, first the outside boom sections are swung inwardly, thereby shifting the center of gravity of the side booms as a whole toward the center of the machine, such that a workman or the driver of the tractor will be able single-handedly to raise the folded side booms into the transport position.

If the outside boom sections can be locked in the working position by means of a shear pin, this will provide sufficient security against damage upon contact with the ground or upon collision with obstructions during operation. It is better, nevertheless, for the outside boom sections to be adapted for locking in their working position by means of resilient elements, since the outside boom sections will then be able to restore themselves automatically to the working position after passing by the obstruction.

If two articulations are provided for the outside boom section to pivot on the inside boom section and they are spaced relatively far apart on their common upright axis, the additional advantage is obtained of stability in the mounting of the outside boom section on the inside boom section. In addition, this arrangement makes it possible for the articulation to be of simple design and for greater clearance to be allowed between the bearing bores and pivots, inasmuch as the clearance in this case will not have such an appreciable adverse effect on the extended attitude of the outside boom sections.

Since the articulations require little or no projection below the inside and outside boom sections, a sufficient ground clearance is advantageously achieved over the entire length of the booms. From another point of view, the booms do not have to be mounted as high on the machine as they would in the case of downwardly projecting articulations, and this is desirable in order to minimize the effect of wind on the spreading operations.

Furthermore, provision is made on the machine, in accordance with the invention, for a boom supporting means, such as a chain or a rod or the like, in order to limit the downward movement of the side booms into the working position, such means being attached to a piece fixedly mounted on the body of the machine. This, again, offers the advantage of a stable maintenance of the side booms in the working position. If the boom supporting means is flexible, it will not have to be detached when the side boom is raised to the transport position. The provision for the change in the length of the boom supporting means, which is proposed in accordance with the invention, has the additional advantage that the side booms can be adapted to the kind of terrain being worked. It is also possible in this manner to compensate for hard-to-avoid dimensional variations involved in production, and this in turn has a favorable influence on the ease of manufacture and on the price of the machine.

If the outer ends of the boom supporting means are attached to the inside boom sections, it will be easier for the outside boom sections to yield to obstructions, while at the same time assuring sufficient stability to the entire boom.

Advantageously, the need for additional abutment means for holding the side booms in the elevated position for transport can be eliminated by letting the upper part of the reservoir serve as the abutment for this purpose.

In one special embodiment of the invention, the outside boom sections, if they can be folded inwardly in only one direction, are provided with outside boom extensions, each adapted for deflection in the opposite direction about an upright axis and to be locked in the extended position by resilient means. In this manner a stable design of the side booms is achieved, together with security against damage in operation, even though it be necessary, due to the use of many hoses, for the boom sections to have a relatively great width in the area of their articulation on one another.

The invention furthermore provides that, when the booms are in the folded or retracted state, the articulations whereby the outside boom sections are pivotally mounted on the inside boom sections will clear the upper edge of the reservoir. This is essential to the achievement of an optimum narrow width and height of the machine when the booms are folded for transport. To achieve the additional advantage of greater working width, the outside boom sections are made longer than the inside boom sections.

The invention additionally provides that the upright articulations are offset such that the outside boom sections will fold flat against the inside boom sections in the transport position. Particularly in the case of three-point hitch machines for mounting on the back of tractors, this makes possible the construction of a machine of the compact length that is desirable.

The outside boom sections can advantageously be longer than the inside boom sections in order to achieve a maximum extended length, provided only that the length of the outside boom section will not be such as to provide insufficient ground clearance when the boom is folded to the transport position.

Lastly, in a preferred embodiment of the invention, the outside boom sections can be pivoted about two upright articulations disposed in tandem in the direction of travel, resilient means being provided in front and in back of said articulations such that, when the outside boom sections are in the working position, the said resilient means will bias them towards the said working position and, when they are in the transport position, the said resilient means will bias them toward the said transport position. As a result of these measures the outside boom sections will be able to pivot both forwardly and rearwardly for folding against the inside boom sections, the possibility being thereby provided for the automatic deflection of the outside boom sections when they encounter an obstruction while in the extended state. Furthermore, the outside boom sections can be held in their extended state and in their retracted stated by the said resilient means alone.

The invention will now be further explained with the aid of the embodiments represented in the appended drawings, wherein:

FIG. 4 is a side elevational view of a three-point hitch machine in accordance with the invention.

FIG. 5 is a top plan view of the machine of FIG. 4.

FIG. 6 is a side elevational view of another three-point hitch machine in accordance with the invention.

FIG. 7 is a top plan view of the machine of FIG. 6, and,

FIG. 8 is a top plan view, on an enlarged scale, of the front articulation of the outside boom section of the machine of FIG. 7.

Figure 1:
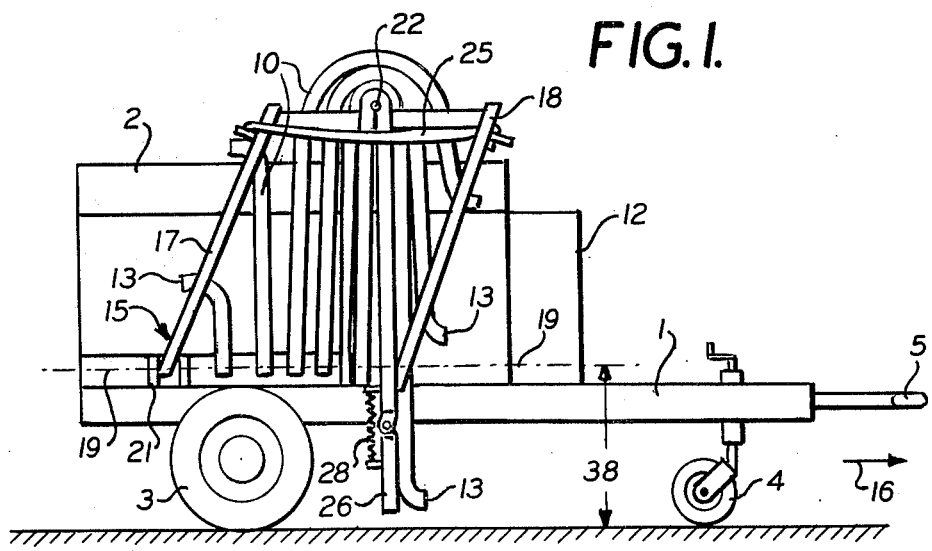
FIG. 1 is a side elevational view of a machine in accordance with the invention, in the form of a trailer.
Figure 2:
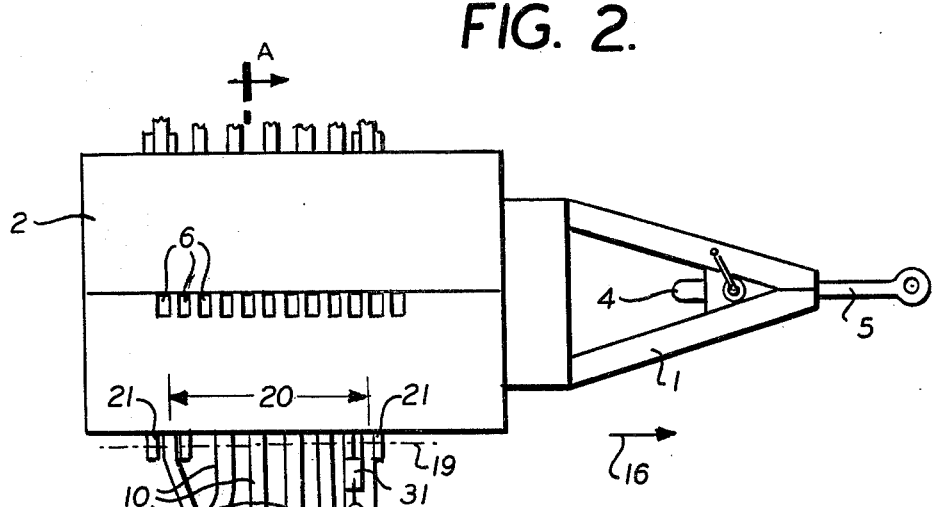
FIG. 2 is a top plan view of the same machine.
Figure 3:
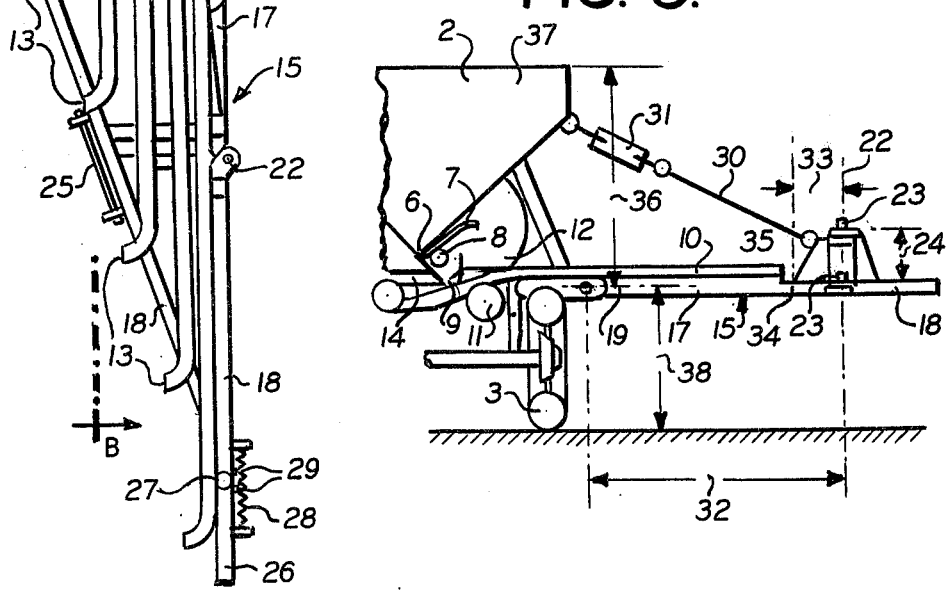
FIG. 3 is a cross sectional view of the same machine, taken along line A–B of FIG. 2.

The machine of FIGS. 1 to 3 is equipped with the frame 1 on which the reservoir 2 is mounted, and which, in the state represented in the drawing, rests on the ground on the wheels 3 and the tongue jack wheel 4. The towing eye 5 is attached to the front end of the frame. After the trailer has been attached to a tractor, which is not shown, the trailer tongue jack is retracted, so that the machine is supported in a known manner on its wheel 3 and the trailer hitch of the tractor.

In known manner, in the bottom of the reservoir 2 there are outlet openings 6 which can be closed by means of shutters 7; the material emerging from the outlet openings 6 during the operation of the machine is fed through the metering mechanism 8 and the injectors 9 to the tubular conduits 10 which are connected by air ducts 11 to the blower 12; and the conduits 10, which are equipped with discharge orifices 13 at their outer extremities, have different lengths, and they are fastened to the central portion 14 of the frame 1 and some are fastened to the side booms 15.

The side booms 15, which extend far beyond the reservoir 2 transversely of the direction of travel indicated by the arrow 16, consist of the inside boom sections 17 and the outside boom sections 18. While the inside boom sections 17 are pivotally mounted on the frame 1 by means of the articulations 21, which are separated from one another by the distance 20, on the axis 19 aligned with the direction of travel 16, the outside boom sections 18 are mounted on the upright axes 22 on the inside boom sections 17. The articulations 23 provided for this purpose are also widely separated, by the distance 24, and are flush with the bottoms of the boom sections 17 and 18.

On account of their width, at the articulation 23 the outside boom sections 18 can be pivoted only forwardly in the direction of travel 16, the axes 22 being located such that the outside boom sections 18 will lie against the inside boom sections 17 when the boom is folded in the transport position. The resilient means 25 disposed on the rearward side of the boom sections 17 and 18 hold the outside boom sections 18 resiliently against the inside boom sections 17 in the working position. If, while the machine is in use, it becomes necessary to back the machine up at the edge of a field, for example, and the outside boom section 18 should encounter an obstruction, it will be able to yield forwardly without the risk of damage. In the folded position for transport, however, the resilient means 25 will hold the outside boom sections resiliently in this position.

To prevent damage to the side booms 15 also during forward movement in the direction of arrow 16, the outside boom sections 18 are provided with outside boom extensions 26 which can swing rearwardly about the upright axis 27 and are held in their working position resiliently against the abutments 29 by means of the resilient members 28. This feature is based on the assumption that, when driving forward, the tractor driver can easily avoid obstructions located relatively close to the machine, but in the case of more distant obstructions it may not be possible for him to estimate precisely whether the outer extremities of the booms 15 will clear them or not.

The side booms 15 are held in the working position by the supporting means 30 attached at one end to the reservoir 2 and at the other end to the inside boom sections 17, such means being flexible cables in the present embodiment. To enable the side booms 15 to be adjusted for height, the supporting means 30 are equipped with the turnbuckles 31. In the transport position, both the inside boom sections 17 and the outside boom sections 18 lie against the reservoir 2.

As best seen in FIG. 3, the distance 32 between the axes 19 pointing in the direction of travel 16 and the upright axes 22 is greater than the distance 36 between the said axes 19 and the upper edge 37 of the reservoir 2, by for example 200 to 300 cm. Furthermore, the outside boom sections 18 are longer than the inside boom sections, by an amount which is less than the distance 38 between axes 19 and the ground, as clearly represented in FIG. 1, with the machine in the parked state. The spacing 24 of the bearings 23 can be, for example, 20 to 40 cm.

FIGS. 4 and 5 show a machine constructed in accordance with the invention as a three-point hitch machine, which is shown resting on the ground. For the sake of clarity, the tubular conduits, which are disposed in the same manner as in the preceding embodiment, have been omitted from the drawing. Also, all parts which are of the same construction as in the machine previously described are identified by the same reference numbers.

This machine is equipped with the frame 39 on the front of which are seen the means 40 and 40' for the attachment of the machine to a tractor, and also the blower 12; the frame 39 also bears the reservoir or hopper 41. Here, again, the booms 43 are mounted so as to pivot on the axes 19 extending in the direction of travel 16 on the central portion 42 on both sides of the machine, and they are composed of the inside boom sections 44 and the outside boom sections 45, the latter being mounted for pivoting about the upright axes 22 provided on the former. In this case both the articulations 21 of the inside boom section 44 and the articulations 23 of the outside boom section 45 are of the same construction as in the machine of FIGS. 1 to 3. Since, however, the hopper 41 is of substantially lesser length and is equipped with only eight outlets 6, the inside boom sections 44 are narrower at their articulations 21, while the outside boom sections 45 each consist of a single, thick tube. As a result, the outside boom sections 45 can be swung either forwardly or rearwardly in folding the booms to the transport position, the forward position 45' being indicated by broken lines. In either case, of course, they cannot be folded to such a degree as to lie against the inside boom sections 44 in the transport position.

For the purpose of holding the outside boom sections 45 resiliently in both the transport position and the working position, the resilient means 25 are provided both on the front side and on the rear side of these booms. Consequently, the outside boom sections 45, when in the working position, can yield if any obstructions are encountered when moving either forward or in reverse. As in the case of the machine first described, the side booms 43 are held in the working position by means of the boom supports 30. Also, the dimensional relationships between the inside and outside boom sections 44-45 and the top edge 37 of the reservoir or box 41 are the same as in the case of the corresponding parts of the machine of FIGS. 1 to 3.

In the three-point hitch machine represented in FIGS. 6 to 8, the tubular conduits have again been omitted for the sake of clarity. This machine has the same frame 39 equipped with the hitching means 40 and 40' and the blower 12, and with the reservoir or box 46.

Underneath the reservoir 46, the side booms 47 are mounted for pivoting about axes 19 aligned in the direction of travel on the central portion 42 of the machine.

Since the reservoir 46 is a longer one than reservoir 41 of the machine of FIG. 5, and also have twelve outlet openings 6, the inside boom sections 48 are broader at their outside extremities. Likewise, the outside boom sections 49 have a greater breadth at their inside extremities.

To enable the outside boom sections 49 of this machine, too, to be folded both forwardly and rearwardly, upright pintles 22 are provided on each side of the machine, one on the leading edge and the other on the trailing edge of each boom 47. Since one of each pair of the bearings 23' must come free of its pintle when the boom is folded, these bearings 23' are open toward one side, as clearly represented in FIG. 8. Also, as in the previously described embodiment, the resilient means 25 are disposed on both sides of the inside and outside boom sections, so that the outside boom sections 49 can be resiliently held both when in the working position and when in the transport position.

In this machine, the chains 50 serve as supporting means to hold the side booms in the working position, and can be shifted on the reservoir 46 for adjustment of length. Also, as in the case of the machines described above, the reservoir 46 serves as an abutment for the side booms 47 in the transport position. Likewise, the relationships of the lengths of the inside and outside boom sections 48 and 49 to one another and to the ground and the upper edge 37 of the reservoir are the same as in the case of the corresponding parts of the embodiment represented in FIGS. 1 to 3, although of course the height 38' of the shafts 19 from the ground is substantially less than height 38 in FIGS. 1 and 3.

SUMMARY

Thus, the invention is directed to a machine suitable for broadcasting of granular material while traveling over an area in which the material is to be distributed. The machine comprises a central reservoir for holding a supply of the material, and two side booms for disposition in the working position transversely of the direction of travel with one boom on each side of the reservoir. Each boom includes an inner boom member and an outer boom member. The inwardly disposed end of each of the inner boom members is interconnected with the reservoir, as by being mounted on a frame on which the reservoir is mounted, by spaced bearings for pivoting about an axis extending in the direction of travel for swinging of the inner boom members to a generally upright transport position. The spaced bearings or bearing points can of course be provided by a single elongated sleeve bearing. A plurality of conduits are connected to the reservoir for receiving the material therefrom and are mounted on the side booms for delivery of the material to spaced discharge points disposed along the booms. The invention provides the improvement whereby each outer boom member is pivotally mounted on the inner boom member on the axis disposed vertically with the side booms in the working position, for folding of the outer boom member into a position aligned with the inner boom member in the direction of travel, for the transport position. In a preferred embodiment, the pivot mounting of the outer boom members on the inner boom members supports the outer boom members in the working position. Thus, in FIG. 3 the articulations 23, as may be provided by pintles, are spaced apart along vertical axis 22, a distance such that the outer boom member 18 is supported on the inner boom member 17, in elevation, by the articulations. The articulations can, of course, be provided by a shaft, in which case the shaft is of sufficient length to provide the desired support.

The reservoir is mounted on a frame or central body member, and a connector for each boom can be disposed over the boom and support the boom from the body member under tension. The connector can be connected to the boom by connection to the inner boom member.

What is claimed is:

1. In a machine suitable for broadcasting of granular material while traveling over an area in which the material is to be distributed, comprising
   a. a central reservoir for holding a supply of the material,
   b. two side booms for disposition in the working position transversely of the direction of travel with one boom on each side of the reservoir, each boom including an inner boom member and an outer boom member, the inwardly disposed end of each of the inner boom members being interconnected with the reservoir by spaced bearings for pivoting about an axis extending in the direction of travel for swinging of the inner boom members to a generally upright transport position,
   c. a plurality of conduits connected to the reservoir for receiving material therefrom and mounted on the side boom for delivery of the material to spaced discharge points disposed along the booms,
   the improvement which comprises:
   d. each outer boom member being pivotally mounted on its inner boom member on an axis disposed vertically with the side booms in the working position for folding of the outer boom member into a position aligned with the inner boom member in the direction of travel, for the transport position.

2. Machine according to claim 1, and means for locking inner boom members and the outer boom members in the working position.

3. Machine according to claim 2, said locking means providing a resilient connection of the inner and outer boom members.

4. Machine according to claim 1, wherein the pivot mounting of each outer boom member on its inner boom member comprises spaced articulations positioned on said vertically disposed axis, which support the outer boom member in the working position.

5. Machine according to claim 4, wherein the pivot mounting of the outer and inner boom members is disposed substantially entirely above the bottom of the boom members with the booms in the working position.

6. Machine according to claim 1, the reservoir being mounted on a central body member, and a connector for each boom disposed over the boom and supporting the boom from the body member under tension.

7. Machine according to claim 6, the connectors being movable.

8. Machine according to claim 6, the connectors being adjustable in length.

9. Machine according to claim 6, in which the connector supports each boom by connection to the inner boom member.

10. Machine according to claim 4, the reservoir being mounted on a central body member, and a connector for each boom disposed over the boom and supporting the boom from the body member under tension by connection to the inner boom member.

11. Machine according to claim 1, wherein in the transport position, the booms abut with the upper portion of the reservoir.

12. Machine according to claim 1, wherein the pivot mounting of the outer boom members on the inner boom members is such that the outer boom members pivot in only one direction, each of said outer boom members having a boom extension pivotally mounted on the outer end thereof on a vertical axis for pivoting in the direction opposite the direction of pivoting of the outer boom member on the inner boom member.

13. Machine according to claim 12, and resilient members locking the boom extensions in the working position.

14. Machine according to claim 1, wherein the reservoir extends above the booms with the booms in the working position, and, for each boom, the distance (32) between the boom pivot axis (19) pointing in the direction of travel and the vertical pivot axis (22) for the boom outer member, is greater than the distance (36) between the boom pivot (19) and the upper margin (37) of the reservoir, by the distance (33) between the vertical pivot axis (22) and the innermost part of the pivot mounting of the outer boom member on the inner boom member.

15. Machine according to claim 14, the outside booms being longer than the inside booms.

16. Machine according to claim 14, wherein the vertical axes for the outer boom members are disposed so that the outer booms members abut the inside booms in the transport position.

17. Machine according to claim 14, wherein the outer boom members are longer than the inner boom members by a lesser amount than the distance of the boom pivot axes (19) from the ground with the machine resting on the ground.

18. Machine according to claim 1, wherein each of the outer boom members is pivotable about two vertically extending axes disposed in tandem with respect to the direction of travel, and comprising resilient means at the front and rear side of the booms for biasing the outer boom members in the working position and in the transport position.

19. Machine according to claim 1, wherein the reservoir extends above the axes of pivot of the inner boom members and, in the transport position, the pivot mountings of the outer boom member on the inner boom members substantially just clear the top of the reservoir.

20. Machine according to claim 10, wherein the pivot mounting of the outer and inner boom members is disposed substantially entirely above the bottom of the boom members with the booms in the working position.

21. Machine according to claim 20, wherein the transport position, the booms abut with the upper portion of the reservoir.

22. Machine according to claim 21, wherein the reservoir extends above the axes of pivot of the inner boom members and, in the transport position, the pivot mountings of the outer boom member on the inner boom members substantially just clear the top of the reservoir.

23. Machine according to claim 22, the outside booms being longer than the inside booms.

* * * * *